(12) United States Patent
Bohmer (10) Patent No.: US 7,614,298 B2
(45) Date of Patent: Nov. 10, 2009

(54) OPAQUE AEROSOL CONTAINER CAPACITY INDICATOR

(75) Inventor: William Bohmer, Succasunna, NJ (US)

(73) Assignee: Display Matrix Corporation, Randolph, NJ (US)

( * ) Notice: Subject to any disclaimer, the term of this patent is extended or adjusted under 35 U.S.C. 154(b) by 606 days.

(21) Appl. No.: 11/079,564

(22) Filed: Mar. 14, 2005

(65) Prior Publication Data

US 2005/0199744 A1    Sep. 15, 2005

(51) Int. Cl.
  *G01F 23/20* (2006.01)
  *G01F 17/00* (2006.01)
(52) U.S. Cl. .......................................... 73/296; 73/149
(58) Field of Classification Search .................. 73/296, 73/149; 222/23
   See application file for complete search history.

(56) References Cited

U.S. PATENT DOCUMENTS 6,667,445 B2 * 12/2003 Chang .......................... 177/254
7,490,509 B2 *  2/2009 Bohmer ........................ 73/149

* cited by examiner

*Primary Examiner*—John Fitzgerald (57) ABSTRACT

Low cost capacity measuring display installed in a label that is attached to an opaque container to measure amount of contents therein. The indicator utilizes the weight of the opaque container in conjunction with a gel reservoir and capillary that is installed in a label. The label extends under the can subjecting the gel reservoir to pressure that results from the weight of the container rendering movement of gel in the capillary that with calibration is a direct representation of the amount of contents in the opaque container.

3 Claims, 7 Drawing Sheets

OPAQUE AEROSOL CONTAINER CAPACITY INDICATOR

BACKGROUND OF THE INVENTION

Products such as hair spray and shaving cream that are sold in containers such as aerosol cans are usually opaque because the pressure required to facilitate the dispensing of the product must be contained in a strong container. The container must be strong enough to withstand substantial internal pressures that are used to force the product out of the container via an outlet that is opened and closed by means of a valve that is activated by the user of the product. Opaque metal cans are generally used instead of transparent materials such as glass to insure that the container can withstand the internal pressure and external handling. Unlike a transparent container you cannot see how much product is remaining in the can after you begin dispensing the product. It is desirable to know how much product remains in a can.

SUMMARY OF THE INVENTION

The object of the invention is to use a novel and inexpensive display that can be installed on the side of an aerosol can either alone or as a component of a printed label that is installed around the can to identify the product that is inside the can. Another object of this invention is that the display will measure the weight of the can which is a direct representation of the total contents of the can. Another object of the invention is to provide a means to insure that the weight of the can be measured when the can is at rest in the upright position by utilizing an indicating display means that extends below and under the bottom of the can rendering a support point that senses the weight of the can and by inference the capacity of contents remaining. Another object of the invention is to utilize a sensing means that can detect and display a wide range of weight categories including low and high weight contents.

DESCRIPTION OF THE PREFERRED EMBODIMENTS

Figure 1:
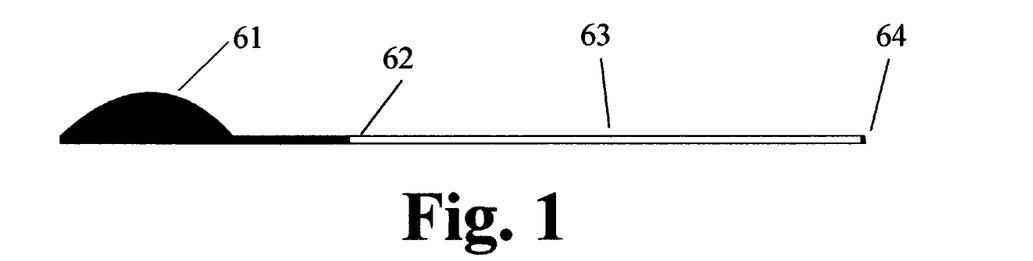
FIG. 1 is a cross section view of a flexible gel filled blister and the capillary extending from the flexible gel filled blister
Figure 2:
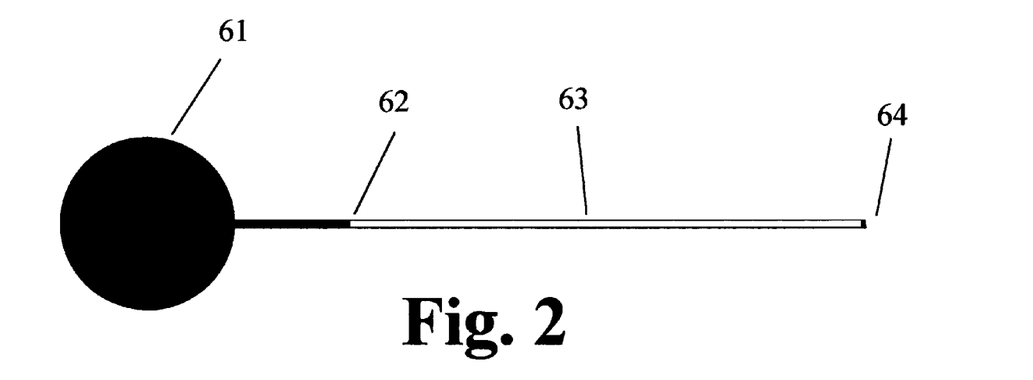
FIG. 2 is a top view of a flexible gel filled blister and capillary extending from the flexible gel filled blister.
Figure 3:
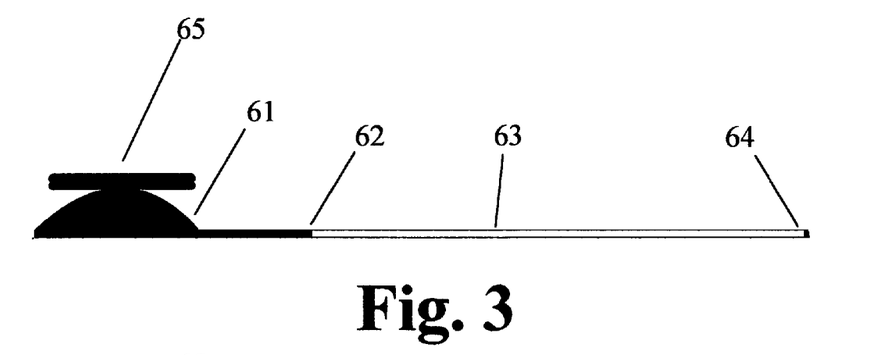
FIG. 3 is a cross section view of the flexible gel filled blister and the capillary extending from the flexible gel filled blister with a flat support member resting on the blister.
Figure 4:
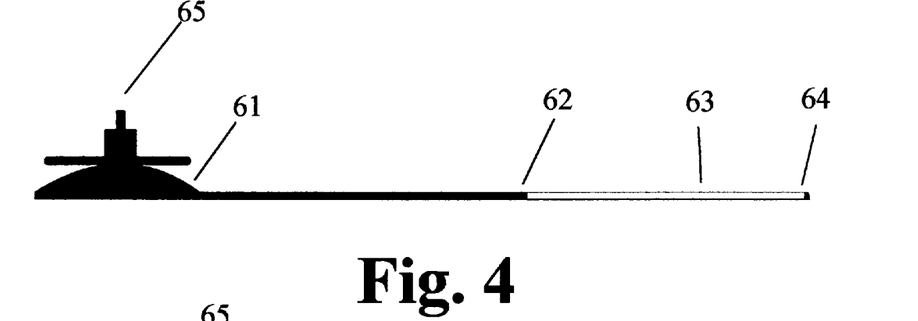
FIG. 4 is a cross section view of the flexible gel filled blister and the capillary extending from the flexible gel filled blister with a flat support member holding a small weight partially compressing the blister.
Figure 5:
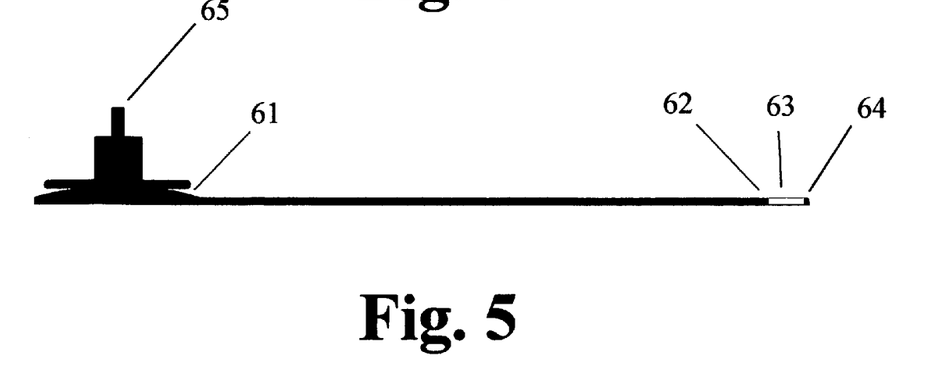
FIG. 5 is a cross section view of the flexible gel filled blister and the capillary extending from the flexible gel filled blister with a flat support member holding a heavy weight completely compressing the blister.
Figure 6:
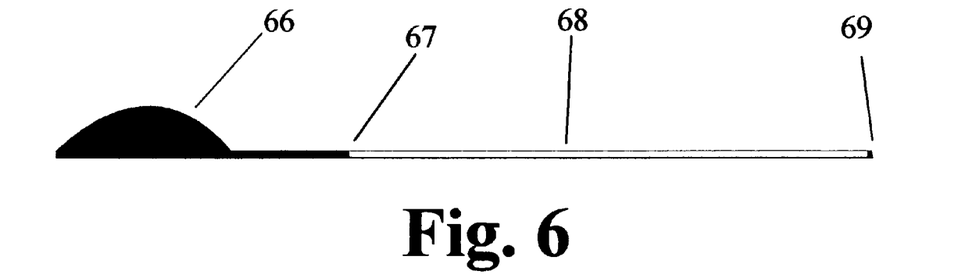
FIG. 6 is a cross section view of the wide flexible gel filled blister and the capillary extending from the flexible gel filled blister.
Figure 7:
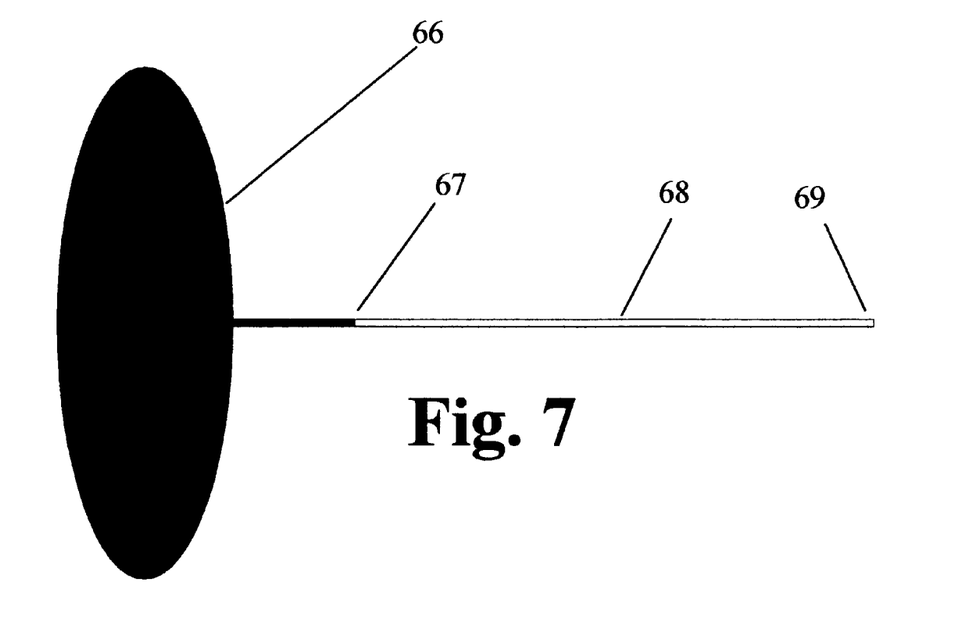
FIG. 7 is a top view of the wide flexible gel filled blister and the capillary extending from the flexible gel filled blister.

FIG. 1 and FIG. 2 show a cross sectional and plane view of an enclosed system comprised of a gel filled flexible film blister 61 and a narrow capillary tube 63 extended from said blister with the gel partially entering the capillary 62. The end of the capillary 64 is left open to allow air to escape when necessary. FIGS. 3, 4 and 5 are cross sectional views of the effect of weight or pressure 65 on the flexible gel blister 61 which forces the edge of the gel supply 62 to advance through the capillary 63. In FIG. 3 there is a small weight or pressure 65 on the flexible gel blister 61 forcing only a small amount of the gel supply to advance through the capillary 63 to a position 62 close to the blister 61 representing low weight or pressure. In FIG. 4 there is a larger weight or pressure 65 on the flexible gel blister 61 forcing a lab amount of the gel supply to advance through the capillary 63 to a position 62 further from the blister 61 representing a larger weight or pressure. In FIG. 5 there is a maximum weight or pressure 65 on the flexible gel blister 61 forcing the maximum amount of the gel supply to advance through the capillary 63 to a position 62 furthest from the blister 61 representing the maximum weight or pressure. The flexible gel blister 61 is substantially larger than the capillary 63 wherein a very small amount of weight or pressure 65 an the blister 61 renders a large movement of the gel 62 in the capillary 63 rendering a system than can detect and display small changes in the weight or pressure 65 applied to the blister 61. FIGS. 6 and 7 show a cross sectional and plane view of an enclosed system comprised of a very wide gel filled flexible film blister 66 and a narrow capillary tube 68 extended from said blister with the gel partially entering the capillary 67. The end of the capillary 69 is left open to allow air to escape when necessary. The enclosed system shown in FIG. 6 and FIG. 7 is the same as the system in shown in FIGS. 1 and 2 except that with the wider and larger blister 66 the system renders a more sensitive movement of the gel 67 through the capillary 68. The combination of a large blister 66 and a small capillary 68 creates a visual amplifier that detects small changes in the weight and pressure placed on the blister.

Figure 8:
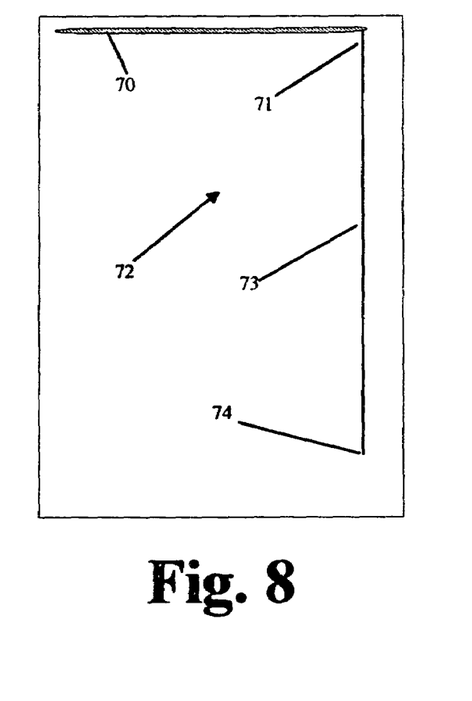
FIG. 8 is a back view of a label containing a long and narrow flexible gel filled blister located near the top edge of the label with a capillary extending from the flexible gel filled blister.
Figure 9:
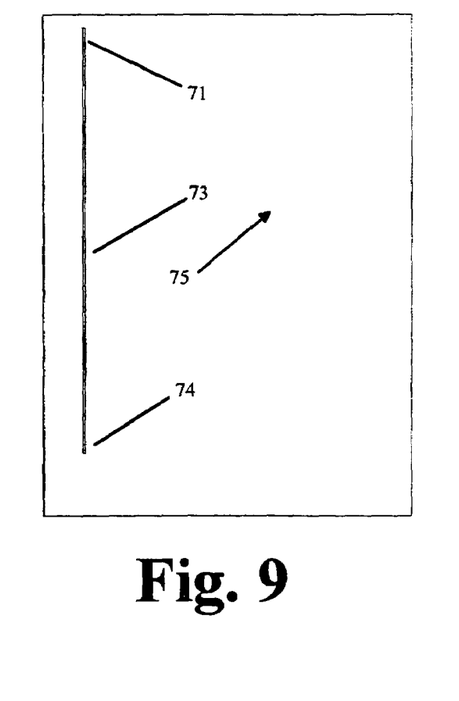
FIG. 9 is a front view of a label containing a transparent section revealing the capillary extending from the flexible gel filled blister.
Figure 10:
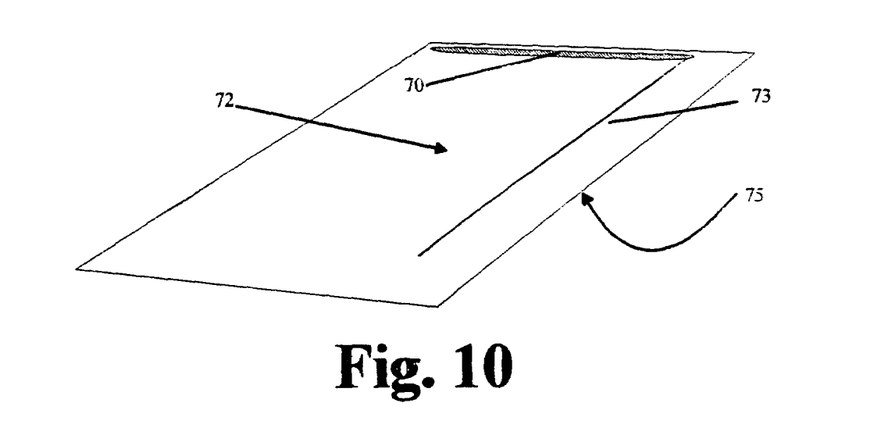
FIG. 10 is a perspective view of the back of a label containing a long and narrow flexible gel filled blister located near the top edge of the label with a capillary extending from the flexible gel filled blister.
Figure 11:
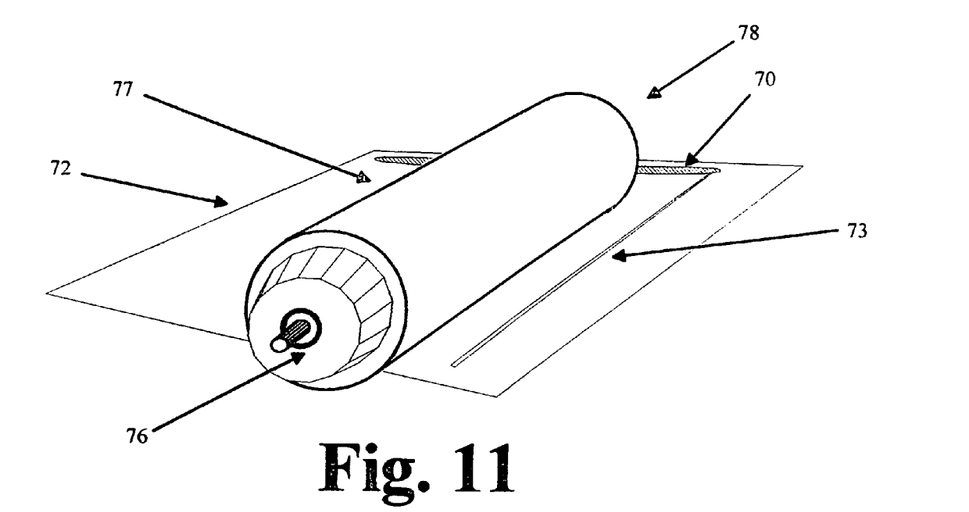
FIG. 11 is a perspective view of a label containing a long and narrow flexible gel filled blister located near the bottom edge of the label with a capillary extending from the flexible gel filled blister aligned under an aerosol container.
Figures 12, 13:
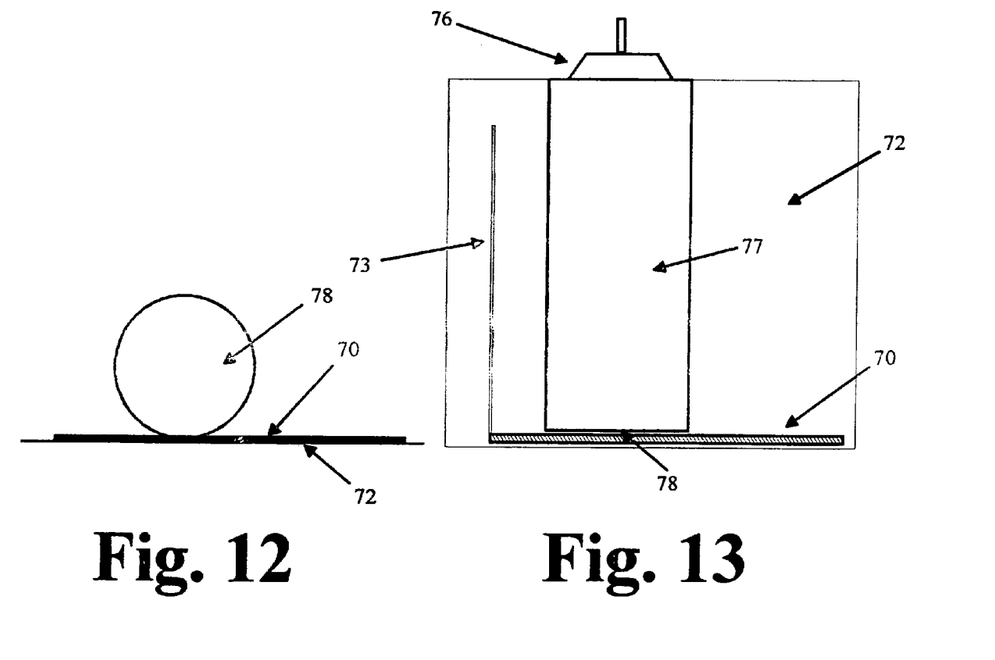
FIG. 12 is a bottom view of a label containing a long and narrow flexible gel filled blister located near the edge of the label aligned under an aerosol container.
FIG. 13 is a plane view showing a label with a capillary extending from the flexible gel filled blister aligned under an aerosol container with the flexible gel filled blister extending just beyond the bottom of the aerosol container.
Figure 14:
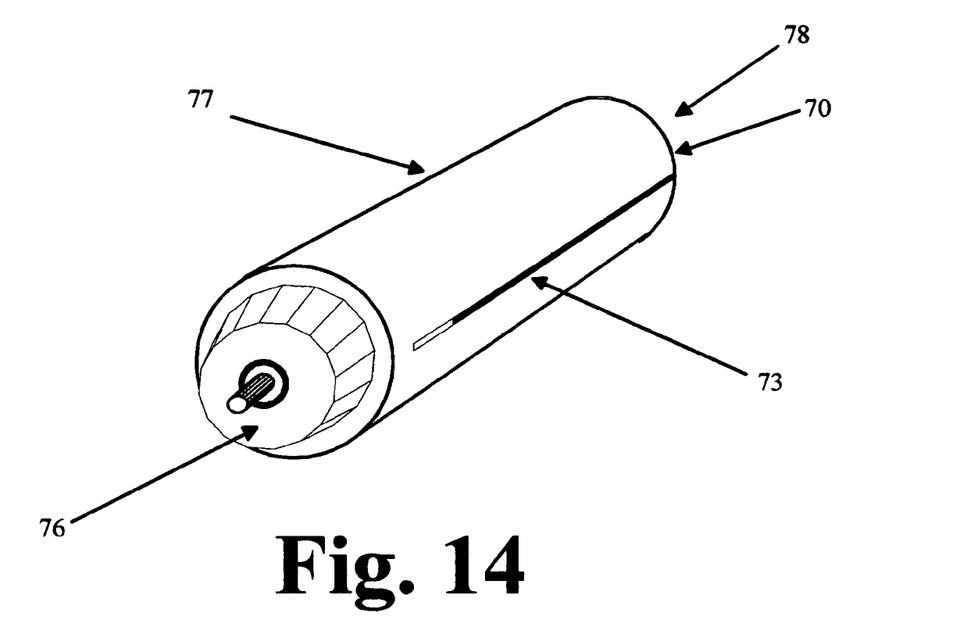
FIG. 14 is a perspective view of the label installed on an aerosol can with the capillary on the wall of aerosol can extending from the flexible gel filled blister that is wrapped under the bottom of the aerosol can.
Figure 15:
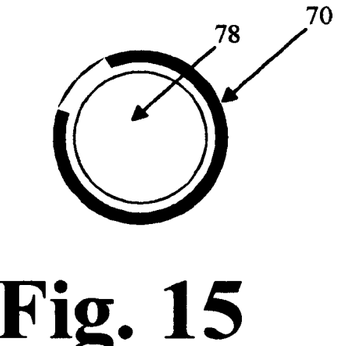
FIG. 15 is a bottom view of the label installed on an aerosol can with the flexible gel filled blister wrapped under the bottom of the aerosol can.
Figure 16:
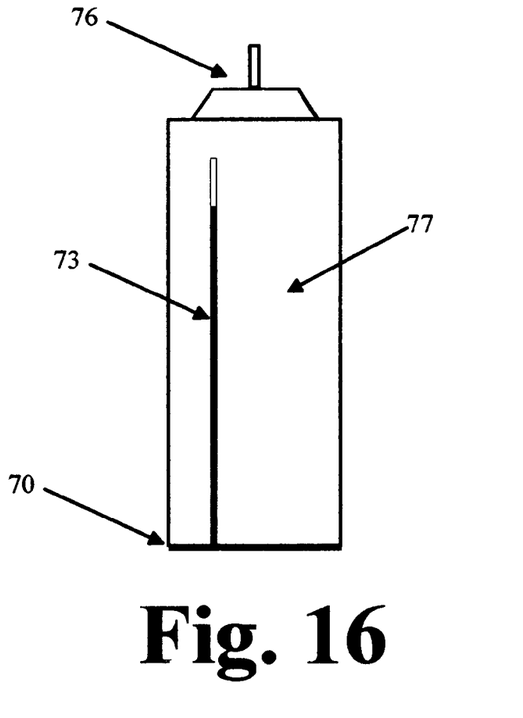
FIG. 16 is a side view of the label installed on an aerosol can with the capillary on the wall of aerosol can extending from the flexible gel filled blister that is wrapped under the bottom of the aerosol can.

The object of this invention is to use this system described above and install it in a label that will be placed on an aerosol can. The label using this system will not only describe what is in the can but also the capacity of contents remaining in the can by using weight or pressure. FIG. 8 is a plane view of the back of a rectangular label 72 that contains an elongated blister 70 situated near the end of the label with an opening 71 at one end of the elongated blister 70 that extends into a capillary 73. The capillary 73 extends along the long axis of the rectangular label to the other end of the rectangular label. The blister 70 and capillary 73 are formed on the back of the label by means of a second layer of film that forms the blister chamber and capillary channel by heat sealing the film around the boundaries of the blister and capillary rendering a self enclosed system that is an integral part of the label. FIG. 9 is a plane view of the front of the rectangular label shown in FIG. 8. The front of the label 75 in FIG. 9 contains a Transparent strip that coincides with the dimensions of the capillary 73 with the point where the capillary 71 exits the hidden blister to the point where it ends 74. It is on this side of the label 75 that printing such as indicia for the capillary channel and product information would be applied. In FIG. 10 the back of the label 72 and the flexible gel blister 70 and capillary 73 are shown in the perspective view. The installation of the label on an aerosol can is shown in FIGS. 11 through 16. FIG. 11 is a perspective view of an aerosol can 77 positioned for installation on the label 72 with the bottom of the can 78 placed just above the blister 70, the top of the aerosol can 76 extended beyond the edge of the label and the capillary 73 parallel to the can 77. FIG. 12 is a bottom view of an aerosol can 78 positioned on the label 72 with the bottom of the can 78 placed just above the blister 70. FIG. 13 is a plane view of an aerosol can 77 positioned on the label 72 with the bottom of the can 78 placed just above the blister 70, the top of the aerosol can 76 extended beyond the edge of the label and the capillary 73 parallel to the can 77. FIG. 14 is a perspective view of the aerosol can 77 following the heat shrink installation of the label with the bottom of the can 78 now having the blister 70 formed under the bottom of the can 78 with the capillary 73 extending along the wall of the can and the top of the aerosol can 76 extended beyond the edge of the label. FIG. 15 is a bottom view of the aerosol can following the heat shrink installation showing the flexible gel blister 70 wrapped under the bottom of the can 78. FIG. 16 is a side view of the aerosol can 77 following the heat shrink installation of the label with the blister 70 on the bottom and the capillary 73 on the wall of the can and the top of the can 76 extended beyond the label.

Figure 17:
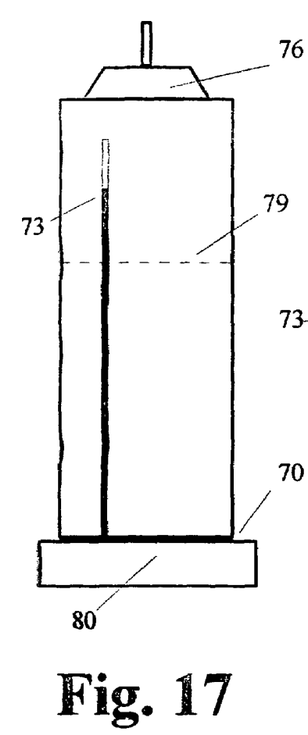
FIG. 17 is a side view of the label installed on an aerosol can with the capillary filled completely with gel on the wall of an aerosol can extending from the flexible gel filled blister that is wrapped under the bottom of the aerosol can.
Figure 18:
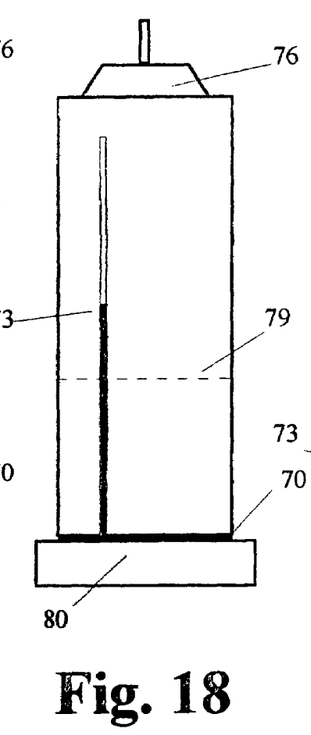
FIG. 18 is a side view of the label installed on an aerosol can with the capillary filled substantially with gel on the wall of an aerosol can extending from the flexible gel filled blister that is wrapped under the bottom of the aerosol can.
Figure 19:
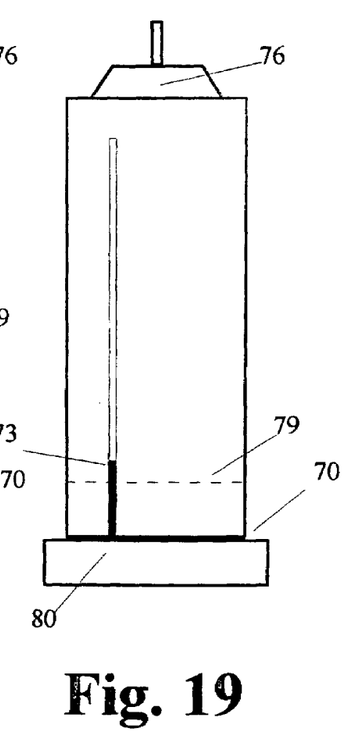
FIG. 19 is a side view of the label installed on an aerosol can with the capillary filled partially with gel on the wall of an aerosol can extending from the flexible gel filled blister that is wrapped under the bottom of the aerosol can.

The operation of the invention is demonstrated in FIGS. 17 through 19. In FIG. 17 the aerosol can 76 is at full capacity in that the product takes up a volume level 79 that is considered full by the manufacturer. The can 76 is resting on a flat surface 80 with the weight of the can pressing down on the flexible gel blister 70 which is wrapped under the bottom of the can resulting in the maximum movement of the gel into the capillary to given maximum height 73 that will be marked as full on a printed scale when the indicia is applied to the label. In FIG. 18 the aerosol can 76 is at half capacity in that the product takes up a volume level 79 that is considered half by the manufacturer. The can 76 is resting on a flat surface 80 with the weight of the can pressing down on the flexible gel blister 70 which is wrapped under the bottom of the can resulting in less movement of the gel into the capillary to given medium height 73 that will be marked as half full on a printed scale when the indicia is applied to the label. In FIG. 19 the aerosol can 76 is at minimum capacity in that the product takes up a volume level 79 that is considered empty by the manufacturer. The can 76 is resting on a flat surface 80 with the weight of the can pressing down on the flexible gel blister 70 which is wrapped under the bottom of the can resulting in very little movement of the gel into the capillary to given minimum height 73 that will be marked as empty on a printed scale when the indicia is applied to the label. The accuracy of the indicator is a determined by the ratio of the length and diameter of the capillary versus the volume of the flexible gel blister. The sensitivity of the indicator is a function of the viscosity of the gel used in the indicator in that a thick gel will move slowly and a thinner gel will move faster. The overall appearance of the indicator is a function of the printing of the label with scales of indicia and other identifiers. Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed:

1. A material amount display for a container for holding material within the interior of the container, the display indicating the amount of the material within the interior of the container when the container is in an upright position, the display comprising:

a structure forming a flexible blister adapted to be placed beneath the bottom portion of the container when the container is in an upright position, and to respond to the weight of the container and the material within the container and the material within the container, the flexible blister is substantially circular in form, having a diameter which is less than the diameter of the bottom portion of the container, and having a height which is maximum to the center thereof;

an elongated tube being formed of material enabling the interior of the elongated capillary tube to be visible from the outside of the elongated capillary tube, the elongated tube having one end thereof connected to the exterior of the blister, the elongated capillary tube being adapted to extend vertically adjacent to the outside surface of the container with the other end portion of the elongated capillary tube being disposed adjacent to the upper portion of the container at which the upper portion of the material held within the container is disposed when he container is filled with the material and in an upright position;

a gel disposed within the interior of the flexible blister and the elongated capillary tube, the gel extending from the blister and through the elongated capillary tube to adjacent to the upper portion of the container when the container is completely filled with the material;

when the material within the container is removed in part, the weight of the container at the bottom portion thereof upon the blister is reduced and causes the gel to recede from adjacent to the upper portion of the container, whereby the level of the gel in the elongated capillary tube recedes in height and indicates the change of the amount of the material within the container.

2. A material amount display for a container in accordance with claim 1, in which the flexible blister is substantially tapered in form from a maximum width at the center thereof to a minimum at each of the oppositely disposed end portions thereof.

3. A material amount display for a container for holding material within the interior of the container, the disiplay indicating the mount of the material within the interior of the container when the container is in an upright position, the display comprising;

- a label adapted to be wrapped around the periphery of the container and having a lower edge portion adapted to extend beneath the bottom portion of the container, the label having an elongated transparent section extending from its lower edge portion toward the top edge portion of the label;
- a structure forming an elongated narrow flexible blister disposed on the label and adapted to be placed beneath the bottom portion of the container when the container is in an upright position and to respond to the weight of the container and the material within the container;
- a capillary elongated tube disposed in the elongated transparent section of the container and the material within the container;
- a capillary elongated tube disposed in the elongated transparent section of the label and being formed of material enabling the interior of the elongated capillary tube to be visible from the outside of the elongated capillary tube, the elongated capillary tube having one end thereof connected to the exterior of the elongated narrow flexible blister, the elongated capillary tube being adapted to extend vertically adjacent to the outside surface of the container with the other end portion of the elongated capillary tube being disposed adjacent to the upper portion of the container at which the upper portion of the material held within the container is disposed when the container is filled with the material and in an upright position;
- a gel disposed within the interior of the elongated narrow flexible blister and the elongated capillary tube, the gel extending from the blister and through the elongated capillary tube to adjacent to the upper position of the container when the container is completely filled with the material;

when the material within the container is removed in part, the weight of the container at the bottom portion thereof upon the blister is reduced and causes the gel to recede from adjacent the upper portion of the container, whereby the level of the gel in the elongated capillary tube recedes in height and indicates the change of the amount of the material within the container.

\* \* \* \* \*